US 9,367,455 B2

(12) United States Patent
Eckert et al.

(10) Patent No.: US 9,367,455 B2
(45) Date of Patent: Jun. 14, 2016

(54) USING PREDICTIONS FOR STORE-TO-LOAD FORWARDING

(71) Applicant: Advanced Micro Devices, Inc., Sunnyvale, CA (US)

(72) Inventors: Yasuko Eckert, Kirkland, WA (US); Lena E. Olson, Madison, WI (US); Srilatha Manne, Portland, OR (US); James M. O'Connor, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 462 days.

(21) Appl. No.: 14/018,562

(22) Filed: Sep. 5, 2013

(65) Prior Publication Data

US 2014/0143492 A1 May 22, 2014

Related U.S. Application Data

(60) Provisional application No. 61/728,843, filed on Nov. 21, 2012.

(51) Int. Cl.
*G06F 9/30* (2006.01)
*G06F 12/08* (2016.01)
*G06F 12/12* (2016.01)

(52) U.S. Cl.
CPC ........ *G06F 12/0802* (2013.01); *G06F 12/0848* (2013.01); *G06F 12/0862* (2013.01); *G06F 12/0864* (2013.01); *G06F 12/0875* (2013.01); *G06F 12/123* (2013.01); *Y02B 60/1225* (2013.01)

(58) Field of Classification Search
None
See application file for complete search history.

(56) References Cited

U.S. PATENT DOCUMENTS 8,966,232 B2 * 2/2015 Tran .................... G06F 9/30189
712/229

OTHER PUBLICATIONS

Tingting Sha, Milo M. K. Martin, and Amir Roth, "NoSQ: Store-Load Communication without a Store Queue," Dec. 2006, In Proceedings of the 39th Annual IEEE/ACM International Symposium on Microarchitecture (MICRO 39), IEEE Computer Society, Washington, DC.

* cited by examiner

*Primary Examiner* — Cheng-Yuan Tseng
(74) *Attorney, Agent, or Firm* — Park, Vaughan, Fleming & Dowler LLP

(57) ABSTRACT

The described embodiments include a core that uses predictions for store-to-load forwarding. In the described embodiments, the core comprises a load-store unit, a store buffer, and a prediction mechanism. During operation, the prediction mechanism generates a prediction that a load will be satisfied using data forwarded from the store buffer because the load loads data from a memory location in a stack. Based on the prediction, the load-store unit first sends a request for the data to the store buffer in an attempt to satisfy the load using data forwarded from the store buffer. If data is returned from the store buffer, the load is satisfied using the data. However, if the attempt to satisfy the load using data forwarded from the store buffer is unsuccessful, the load-store unit then separately sends a request for the data to a cache to satisfy the load.

26 Claims, 4 Drawing Sheets

USING PREDICTIONS FOR STORE-TO-LOAD FORWARDING

RELATED CASES

This application is a non-provisional application from, and hereby claims priority under 35 U.S.C. §119 to, U.S. provisional patent application No. 61/728,843, which is titled "Revisiting Stack Caches for Energy Efficiency," by Yasuko Eckert, Srilatha Manne, Mark Hill, and Lena Olson, which was filed on 21 Nov. 2012, and which is incorporated by reference.

BACKGROUND

1. Field

The described embodiments relate to computing devices. More specifically, the described embodiments relate to using predictions for store-to-load forwarding in a computing device.

2. Related Art

Many modern computing devices include a core (e.g., a central processing unit (CPU) core, a graphics processing unit (GPU) core, an Accelerated processing unit (APU) core, etc.) with a store buffer that is used to conceal, from processing circuits in the core, the latency associated with writing data back to a memory hierarchy connected to the core (where the memory hierarchy includes one or more caches and/or memories). In these cores, as a store is retired from processing circuits and data for the store is ready to be written to the memory hierarchy, the processing circuits write the store data to an entry in the store buffer. The processing circuits then proceed with subsequent computational operations as if the store data has been written back to the memory hierarchy. However, the store data remains buffered in the store buffer until the memory hierarchy is available for the store data to be written to the memory hierarchy (e.g., until a cache is not busy), thereby concealing the latency of the memory hierarchy from the processing circuits in the core.

In such cores, while the data is buffered in the store buffer, the data can be forwarded from the store buffer to the processing circuits. This forwarding ensures that the processing circuits receive the most recent, and therefore correct, version of data. In some cores, forwarding is achieved by, when data is to be loaded (e.g., in response to a load instruction), simultaneously (in parallel) sending requests for the data for satisfying the load to both the store buffer and to the memory hierarchy. Then, if data is returned (i.e., forwarded) from the store buffer, the data returned from the store buffer is used to satisfy the load. Otherwise, if no data is returned from the store buffer, data returned from the cache is used to satisfy the load. However, sending requests to both the store buffer and the cache as described is inefficient (in terms of power usage, computational effort, and communication bandwidth) when the data is available in the store buffer.

SUMMARY

The described embodiments include a core that uses predictions for store-to-load forwarding. In the described embodiments, the core comprises a load-store unit, a store buffer, and a prediction mechanism. During operation, the prediction mechanism generates a prediction that a load will be satisfied using data forwarded from the store buffer because the load loads data from a memory location in a stack. Based on the prediction, the load-store unit first sends a request for the data to the store buffer in an attempt to satisfy the load using data forwarded from the store buffer. If the attempt to satisfy the load using data forwarded from the store buffer is unsuccessful, the load-store unit then separately sends a request for the data to a cache to satisfy the load. Thus, when it is predicted that the load will be satisfied using data forwarded from the store buffer, the request for the data is not sent to the cache when the request for the data is sent to the store buffer, but rather the request for the data is sent to the cache only after the attempt to satisfy the load using data forwarded from the store buffer is determined unsuccessful. In these embodiments, when the prediction mechanism does not predict that the load will be satisfied using data forwarded from the store buffer because the load loads data from a memory location in a non-stack region (e.g., a memory location in a heap, a code region, a data region, a block-started-by-symbol or "bss" region, etc.), the load-store unit simultaneously/in parallel (i.e., during overlapping timeframes) sends: (1) a request for the data to the store buffer in an attempt to satisfy the load using data forwarded from the store buffer, and (2) a request for the data to a cache to load the data.

BRIEF DESCRIPTION OF THE FIGURES

Throughout the figures and the description, like reference numerals refer to the same figure elements.

DETAILED DESCRIPTION

Figure 1:
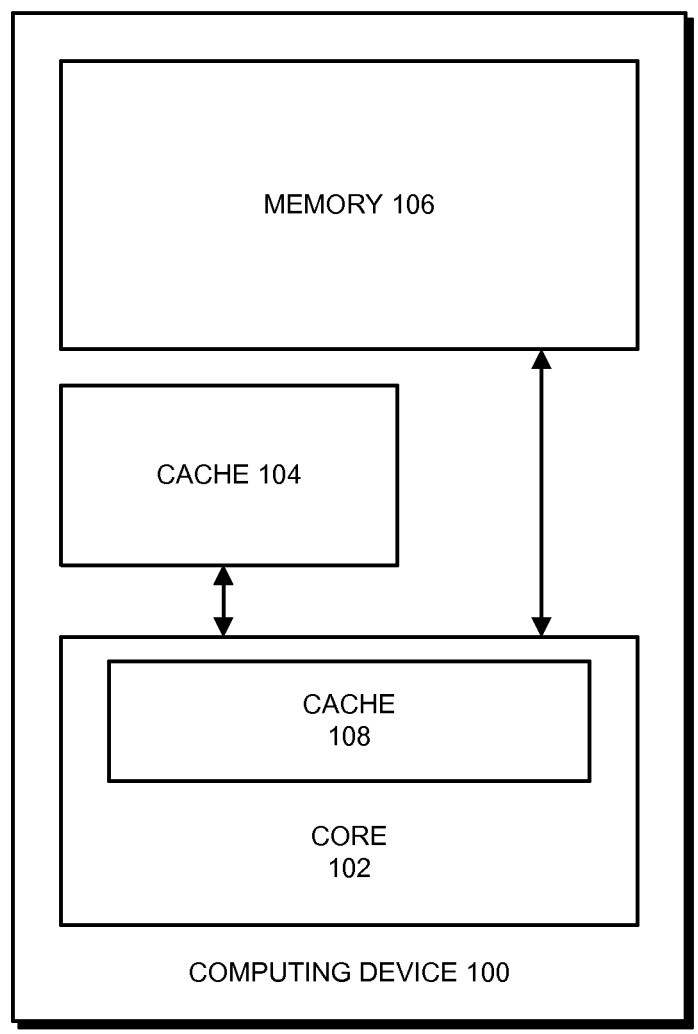
FIG. 1 presents a block diagram illustrating a computing device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Overview

The described embodiments include a core (e.g., CPU core, a GPU core, an APU core, etc.) that sends requests for data to satisfy a load (i.e., complete the load by loading the data to a given register in the core) to a store buffer and/or a cache based on a prediction whether or not the load will be satisfied using data forwarded from a store buffer. In these embodiments, the prediction is made based on whether or not the load loads data from a memory location in a stack (in contrast to loading the data from a non-stack region such as from a heap, a code region, a data region, a bss region, etc.). For example, in some embodiments, the core, using information from or about the load, determines whether the load loads data from a memory location in the stack. When the load loads data from a memory location in the stack, the core predicts that data for satisfying the load is present in the store buffer and thus a request to the store buffer will likely return data for satisfying the load. Based on this prediction, the core first sends a request for the data to the store buffer in an attempt to satisfy the load using data forwarded from the store buffer. The core does this without simultaneously sending a request for the data for the load to a cache (i.e., only sends a request for the data to the store buffer). If the data is returned/forwarded from the store buffer, the load is complete. Otherwise, if the attempt to satisfy the load using data forwarded from the store buffer is unsuccessful because the data is not held in the store buffer, the core sends a request for the data to the cache.

In contrast to the case described above, when the load does not load data from a memory location in the stack and thus loads the data from the non-stack region (e.g., from a heap, a code region, a data region, a bss region, etc.), the core does not predict that data for satisfying the load is present in the store buffer. The core therefore simultaneously sends: (1) a request for the data to the store buffer in an attempt to satisfy the load using data forwarded from the store buffer and (2) a request for the data to the cache. In these embodiments, when sending requests (1) and (2) "simultaneously," the core sends the requests in parallel and with overlapping timeframes (i.e., transmits each request at substantially the same time), so that request (1) is sent when request (2) is sent.

In some embodiments, the information from or about the load used for making the prediction includes some or all of an address for the load. For example, some or all of a physical, virtual, effective, absolute, or relative address may be used as the information from or about the load. In some of these embodiments, the core monitors the location of the stack in memory (i.e., keeps a record of the memory locations included within the stack) and uses the address for the load and the location of the stack in memory to determine if the address for the load is an address in the stack.

In some embodiments, the core adjusts (e.g., changes, updates, etc.) the prediction based on information from one or more sources other than the load itself. For example, in some embodiments, the prediction is adjusted based information about stores in the store buffer. In some of these embodiments, when the store buffer contains less than a threshold number of stores that store data to memory locations in the stack, the core does not predict that the data for a load is present in the store buffer. As another example, in some embodiments, the prediction is adjusted based on information about the core. In some of these embodiments, when the core is operating in a predetermined operating state (e.g., low power, etc.), the core automatically sends the load to the store buffer to be satisfied first, only sending the load to the cache in the event that data for satisfying the load is not held in the store buffer.

The use of predictions to forward data from the store buffer in these embodiments differs from existing systems, in which a core automatically and simultaneously (i.e., in parallel, with overlapping timeframes, etc.) sends a both request for the data to the store buffer in an attempt to satisfy the load and sends a request for the data for the load to the cache. By using predictions to forward data from the store buffer, the described embodiments can save power and avoid extra communication with the cache, which can improve overall system performance.

Computing Device

FIG. 1 presents a block diagram illustrating computing device 100 in accordance with some embodiments. As can be seen in FIG. 1, computing device includes core 102, cache 104, and memory 106. Core 102 is a functional block that performs computational operations in computing device 100. For example, core 102 can include one or more of a central processing unit (CPU) core, a graphics processing unit (GPU) core, an Accelerated processing unit (APU) core, etc.

Core 102 includes cache 108. Cache 108 includes circuits (memory circuits, control circuits, etc.) that are used for storing data and instructions that are used by core 102 for performing computational operations. For example, cache 108 can include one or more of static random access memory (SRAM), embedded dynamic random access memory (eDRAM), DRAM, double data rate synchronous DRAM (DDR SDRAM), and/or other types of memory circuits. Generally, cache 108 is a smaller than cache 104 and is located closer than cache 104 to the functional blocks (e.g., execution unit 306 (see FIG. 3), instruction fetch unit 300, etc.) in core 102 that use the instructions and data. The closeness of cache 108 to the functional blocks enables faster access to the instructions and data in cache 108 than in cache 104.

Cache 104 includes circuits (memory circuits, control circuits, etc.) that are used for storing data and instructions that are used by core 102 for performing computational operations. For example, cache 104 can include one or more of SRAM, eDRAM, DRAM, DDR SDRAM, and/or other types of memory circuits. Generally, cache 104 is larger (i.e., includes more memory circuits) than cache 108 and is located outside, but close to, core 102. In some embodiments, cache 104 is located on a same semiconductor die as core 102. Because cache 104 is located outside core 102, access to the instructions and data stored in cache 104 is slower than accesses to cache 108.

Memory 106 comprises circuits (memory circuits, control circuits, etc.) that are used for storing data and instructions that are used by core 102 for performing computational operations. For example, memory 106 can include one or more of DRAM, SRAM, DDR SDRAM, and/or other types of memory circuits. Memory 106 (which serves as the "main memory" of computing device 100) includes significantly more memory circuits than caches 108 and 104, but accessing data and instructions in memory 106 is slower than accessing data and instructions in either of caches 108 and 104.

Taken together, cache 108, cache 104, and memory 106 form a "memory hierarchy" in computing device 100. Each of the caches and memory 106 are regarded as levels of the memory hierarchy, with the lower levels including the cache 104 and memory 106. Within computing device 100, memory requests are preferentially handled in the level of the memory hierarchy that results in the fastest and/or most efficient operation of computing device 100.

Although embodiments are described using core 102 and the memory hierarchy, some embodiments include a different number and/or arrangement of cores and/or a different number and/or arrangement of caches in the memory hierarchy. For example, some embodiments have two, six, eight, or another number of cores—with the memory hierarchy adjusted accordingly. As another example, the caches (e.g., cache 108, etc.) can be divided into separate instruction and data caches and/or computing device 100 can include different levels of caches, from only one level of cache to multiple levels of caches, and these caches can be located in core 102 and/or external to core 102. Generally, the described embodiments can use any arrangement of cores and caches that can perform the operations herein described.

In addition, although computing device 100 and core 102 are simplified for illustrative purposes, in some embodiments, computing device 100 and/or core 102 include additional mechanisms for performing the operations herein described and other operations. For example, computing device 100 and/or core 102 can include power controllers, mass-storage devices such as disk drives or large semiconductor memories (as part of the memory hierarchy), batteries, media cores, input-output mechanisms, communication mechanisms, networking mechanisms, display mechanisms, etc.

The Stack and the Non-Stack Region

Figure 2:
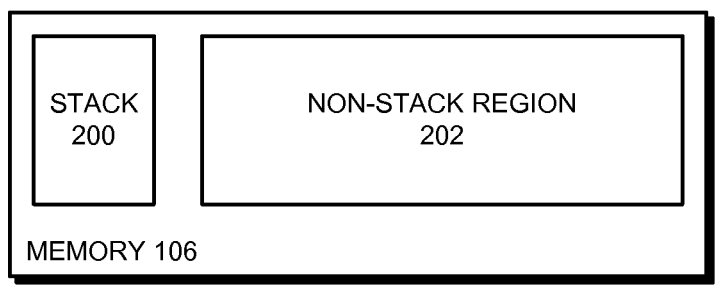
FIG. 2 presents a block diagram illustrating a stack and a non-stack region in a memory in accordance with some embodiments.

In some embodiments, core 102 uses portions of memory 106 as a stack and a non-stack region. That is, core 102 treats different portions of memory 106 as a stack and a non-stack region, the non-stack region including, e.g., one or more of a heap, a code region, a data region, a bss region, etc. FIG. 2 presents a block diagram illustrating stack 200 and non-stack region 202 in memory 106 in accordance with some embodiments. Generally, stack 200 includes a contiguous set of memory locations in memory 106 where data is added in a last-in-first-out manner (LIFO). In some embodiments, to enable using stack 200, core 102 maintains a record of a base (or start) of stack 200 and a top (or end) of stack 200 in memory 106. For example, in some embodiments, core 102 maintains a pointer to the base of stack 200 and a record of the size of stack 200 and/or a pointer to the top of stack 200. When data is added to stack 200, the data is added at the end of stack 200 (e.g., "pushed" onto stack 200) and the size of the stack and/or the top of the stack pointer is adjusted to indicate the updated top of the stack 200. When data is removed from the stack 200, data is removed from the end of the stack 200 (e.g., "popped" from the stack 200) and the size of the stack and/or the top of the stack pointer is adjusted to indicate the updated top of the stack 200. In contrast to stack 200, non-stack region 202 includes memory locations in memory 106 that may be assigned for use by core 102 in any order based on rules for the particular memory location (as described above, non-stack region 202 may include one or more of a heap, a code segment, a data region, a bss region, etc., each of which has corresponding memory location assignment rules).

In some embodiments, as core 102 uses stack 200 to hold context data during context switches (e.g., subroutine calls, error handling routines, thread scheduling, etc.) to enable core 102 to operate in the new context and/or switch back to a previous context. In these embodiments, context data is pushed on stack 200 when core 102 switches from a first context to a second context (e.g., when a subroutine call is made by a thread executing on core 102), and the context data is popped from stack 200 to enable core 102 to operate in the new context and/or switch back from the second context to the first context. For example, stack 200 may be a call stack that is used to hold function parameters, return addresses, etc. In some embodiments, core 102 uses stack 200 to store data from processor registers (e.g., as one or more extra registers when all registers are in use), pushing and popping data from the register to add the data to stack 200 and remove the data from stack 200 as described above.

Note that stack 200 and/or non-stack region 202 are not necessarily in a predetermined location in memory, nor is stack 200 and/or non-stack region 202 a predetermined/set size—blocks are shown in FIG. 2 simply for illustration. Additionally, stack 200 and non-stack region 202 may or may not include all of the addresses in an address space for memory 106. Thus, at least some of memory 106 may not be included in stack 200 or non-stack region 202 and may therefore be used for other purposes by core 102. Generally, stack 200 and non-stack region 202 include sufficient memory to perform the operations herein described.

Core

Figure 3:
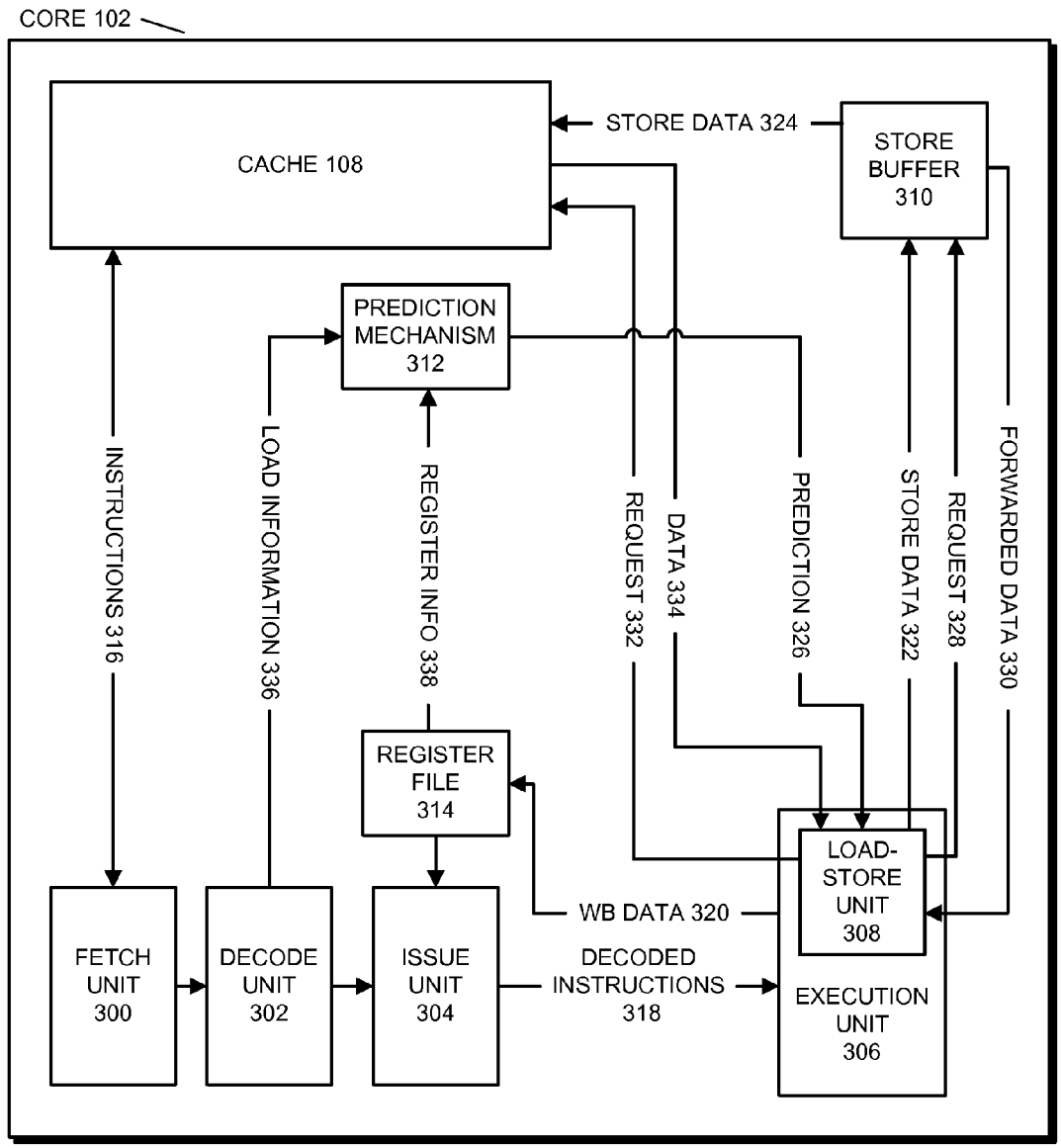
FIG. 3 presents a block diagram illustrating a core in accordance with some embodiments.

FIG. 3 presents a block diagram illustrating core 102 in accordance with some embodiments. As can be seen in FIG. 3, core 102 includes various functional blocks: fetch unit 300, decode unit 302, issue unit 304, execution unit 306, load-store unit 308, store buffer 310, prediction mechanism 312, and register file 314. Fetch unit 300 fetches instructions 316 for execution from cache 108 (or, if instructions 316 are not available in cache 108, from lower levels in the memory hierarchy). Decode unit 302 decodes the instructions fetched by fetch unit 300 to prepare the instructions for execution in execution unit 306 and sends the decoded instructions to issue unit 304. Issue unit 304 sends decoded instructions 318 to appropriate functional blocks within execution unit 306. Execution unit 306 includes various functional blocks configured to execute corresponding types of decoded instructions 318 which were sent from issue unit 304. For example, in some embodiments, execution unit 306 includes one or more floating-point execution units, which execute floating-point instructions, integer execution units, which execute integer instructions, branch execution units, which execute branch instructions, and/or load-store units 308, which execute memory-access instructions such as load instructions and store instructions. Upon completing executing decoded instructions 318, execution unit 306 writes results (if any) as write-back data 320 (shown as "WB data 320") to register file 314 for use during subsequent operations.

Load-store unit 308 performs various operations to complete loads and stores when executing various memory-access instructions (e.g., load instructions, store instructions, etc.). As an example of the operations performed by load-store unit 308, in some embodiments, upon generating an address and/or store data 322 for an instruction that causes load-store unit 308 to store data in memory (generally "a store instruction"), load-store unit 308 sends the address and/or store data 322 to store buffer 310. Store buffer 310 is a functional block that includes a number of entries that are used for holding (or "buffering") store data (and corresponding metadata such as the address for the store) for stores that have completed execution in preparation for sending the store data to cache 108 (and/or lower levels of the memory hierarchy) to be stored therein. In some embodiments, as a store instruction is decoded in decode unit 302, an entry is reserved for the store instruction in store buffer 310. Then, when an address and/or store data 322 are generated for the store instruction in load-store unit 308, the address and/or store data 322 are written to the reserved entry in store buffer 310. Store buffer 310 holds the store data 322 until the corresponding store instruction commits (i.e., retires). When the corresponding store instruction has committed and cache 108 is available to accept store data 322 (e.g., when cache 108 is not busy), store buffer 310 writes store data 322 (shown as store data 324 for clarity) to cache 108.

Figure 4:
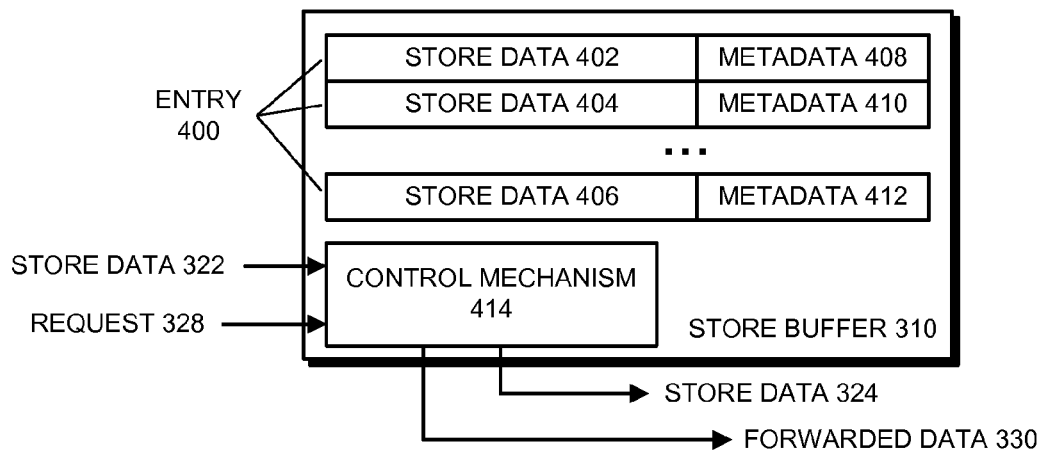
FIG. 4 presents a block diagram illustrating a store buffer in accordance with some embodiments.

FIG. 4 presents a block diagram illustrating store buffer 310 in accordance with some embodiments. As can be seen in FIG. 4, store buffer 310 includes a number of entries 400 and control mechanism 414. Each entry 400 includes circuits (e.g., memory circuits, etc.) for storing store data (e.g., store data 402-406) and associated metadata (e.g., metadata 408-412). The store data portion of each entry 400 in store buffer 310 is configured to store types of data or combinations of types of data that can be an output of a store operation from load-store unit 308. For example, the store data portion can store one or more of bytes, integers, floating point values, cache blocks, etc. The metadata portion of each entry 400 is configured to store metadata useful for handling and/or identifying the corresponding store data. For example, the metadata may include information for some or all of: identifying the store that generated the associated store data; identifying an address in memory 106 to which the store is directed; identifying data in the associated store data; and forwarding the store. In some embodiments, the metadata includes information (e.g., a bit) that indicates whether the store data is destined for a memory location in stack 200 (or a memory location in non-stack region 202).

Control mechanism 414 is a functional block that includes circuits configured to: handle storing data in store buffer 310 (e.g., for writing received data into an appropriate entry 400, maintaining data in entries 400, writing buffered store data to the memory hierarchy, etc.), receive request 328 from load-store unit 308, determine if data for satisfying request 328 is present in any entry 400, and return a response to load-store unit 308 either with data or indicating that data is not present in store buffer 310. For example, in some embodiments, control mechanism 414 includes a look-up mechanism (e.g., a content-addressable memory or CAM) that can be used to determine if store data in an entry 400 in store buffer 310 can be used to satisfy a request 328.

In some embodiments, after a store instruction is committed (i.e., retired) and the corresponding store data in an entry 400 in store buffer 310 is written to cache 108 (as store data 324), the store data in the entry 400 in store buffer 310 may be deleted, invalidated, and/or overwritten by subsequent store data from load-store unit 308.

As another example of the operations performed by load-store unit 308 to complete loads and stores, in some embodiments, as part of executing an instruction that causes load-store unit 308 to load data from memory (generally, a "load instruction"), load-store unit 308 uses prediction 326 generated by prediction mechanism 312 to determine if and/or how requests for the data to satisfy the load are to be sent to store buffer 310 and cache 108. In some embodiments, prediction 326 is based on a memory location from where the data for the load instruction is loaded. If the data is loaded from stack 200, the prediction is that the load will be satisfied using forwarded data 330 from store buffer 310 because the data for satisfying the load is likely present in store buffer 310. Otherwise, if data is loaded from non-stack region 202, the load is not predicted to be satisfied using data forwarded from store buffer 310.

In these embodiments, when prediction 326 indicates that the data for satisfying the load is likely to be present in store buffer 310, load-store unit 308 uses a serial approach to sending requests for the data to store buffer 310 and cache 108. More specifically, load-store unit 308 first sends request 328 for the data to store buffer 310 in an attempt to satisfy the load using forwarded data 330 from store buffer 310. In this case request 328 is sent alone, in that request 332 for data 334 (i.e., data from cache 108 that satisfies the load) is not simultaneously sent to cache 108. If forwarded data 330 is returned from store buffer 310, forwarded data 300 is used to satisfy the load—and request 332 is not sent to cache 108. However, if store buffer 310 does not hold the data to satisfy the load, and thus the attempt to satisfy the load using forwarded data 330 from store buffer 310 is unsuccessful, load-store unit 308 sends request 332 for data 334 to cache 108. Note that request 332 for data 334 will either return data 334 or cause an error (because data 334 will be retrieved from lower levels of the memory hierarchy, if necessary).

In contrast to cases where prediction 326 indicates that the data for satisfying the load is likely to be present in store buffer 310, when the load is not predicted to be satisfied using data forwarded from store buffer 310, load-store unit 308 uses a parallel approach to sending requests for the data to store buffer 310 and cache 108. More specifically, load-store unit 308 simultaneously sends both: (1) request 328 to store buffer 310 in an attempt to satisfy the load using forwarded data 330 from store buffer 310 and (2) request 332 for data 334 to a cache 108 to satisfy the load. In these embodiments, when sending requests (1) and (2) "simultaneously," the core sends the requests in parallel and with overlapping timeframes (i.e., transmits each request at substantially the same time), so that request (1) is sent when request (2) is sent.

Sending requests 328 and/or 332 as described based on prediction 326 can save electrical power, computational effort, and communication bandwidth for cache 108 because request 328, which is sent alone when the data for the load is predicted to be held in store buffer 310, can satisfy the load using forwarded data 330, which avoids the need for sending request 332 to cache 108.

Returning to FIG. 3, prediction mechanism 312 is a functional block that takes information about a load as input(s) and, using the information about the load, generates prediction 326 for the load. Generally, the information about the load taken as input(s) by prediction mechanism 312 can include any information that is useful for determining if a load loads data from a memory location in stack 200 (or is likely to load data from a memory location in stack 200). For example, in some embodiments, prediction mechanism 312 takes load information 336 as an input. In some embodiments, load information 336 includes one or more indications of an address for the load (e.g., information for determining an address such as a register identifier, a base pointer and an offset, an immediate value, etc.) and/or other information from and/or about the load. As another example, in some embodiments, prediction mechanism 312 takes register information 338 as an input. Register information 338 includes metadata about source register(s) for the load instruction (e.g., a bit set to indicate that the register(s) were previously used as a destination in an operation involving stack 200, etc.).

Figure 5:
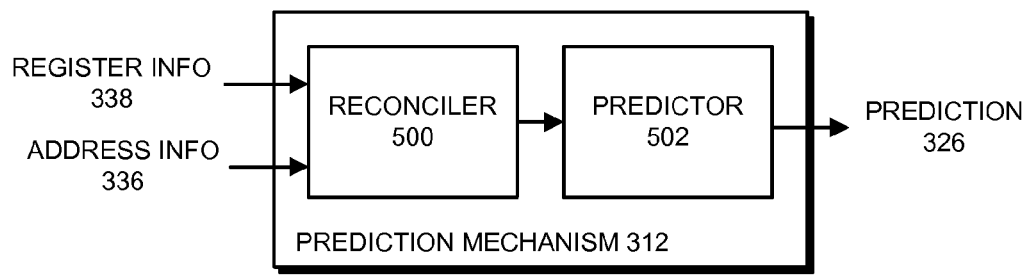
FIG. 5 presents a block diagram illustrating a prediction mechanism in accordance with some embodiments.

FIG. 5 presents a block diagram illustrating prediction mechanism 312 in accordance with some embodiments. As can be seen in FIG. 5, prediction mechanism 312 includes reconciler 500 and predictor 502. Reconciler 500 is a functional block that takes information from and/or about a load (shown in FIG. 5 with load information 336 and register information 338) as inputs and generates information about the load instruction that is used by predictor 502 for generating prediction 326. For example, in some embodiments, reconciler 500 uses load information 336 to compute/resolve an address for the load (e.g., computes a virtual, physical, effective, etc. address for the load from a base pointer and an offset value, from some or all of an address for the load from one or more registers in core 102, etc.) and then sends the resolved address to predictor 502 as the information about the load. As another example, in some embodiments, reconciler 500 acquires a base pointer (which could be a pointer to the base of stack 200 or another pointer) from the load information 336 and sends the base pointer or an address computed therefrom to predictor 502 as the information about the load. As yet another example, in some embodiments, reconciler 500 uses register information 338 to determine that one or more source registers for the load were previously used in an operation involving stack 200 and then sends the information about the source registers to predictor 502 as the information about the load.

Predictor 502 is a functional block that is configured to generate prediction 326 from the information about the load instruction received from reconciler 500. More specifically, upon determining that the load loads data from a memory location in stack 200 (or is likely to load data from a memory location in stack 200), predictor 502 generates a prediction 326 that the load will be satisfied using data forwarded from store buffer 310. Otherwise, predictor 502 generates prediction 326 that does not predict that the load will be satisfied using data forwarded from store buffer 310 (or does not generate prediction 326).

In some embodiments, predictor 502 receives a resolved address for the load from reconciler 500. In these embodiments, predictor 502 compares the resolved address for the load to a range of addresses in memory for stack 200 (which are indicated by a pointer to the base of stack 200 and a size of stack 200 and/or a pointer to the top of stack 200 that are maintained by core 102) to determine if the resolved address falls in the range of addresses in memory for stack 200 and thus the load loads data from a memory location in stack 200. Predictor 502 then generates a prediction 326 that the load will be satisfied using data forwarded from store buffer 310 when the address for the load falls in the range of addresses in memory for stack 200.

As another example, in some embodiments, predictor 502 receives a base pointer for the load or an address generated therefrom. In these embodiments, predictor 502 determines if the base pointer or the address generated therefrom is within a predetermined number of memory locations of the base pointer for the stack (i.e., if the load likely loads data from a memory location in the stack). For example, if the base pointer or the address generated therefrom is within eight memory addresses from the base pointer for the stack. Predictor 502 then generates a prediction 326 that the load will be satisfied using data forwarded from store buffer 310 when the base pointer or the address generated therefrom is within the predetermined number of memory locations of the base pointer for the stack.

As yet another example, in some embodiments, predictor 502 receives an indication that registers for the load were previously used in an operation involving stack 200. In these embodiments, generates a prediction 326 that the load will be satisfied using data forwarded from store buffer 310 because the registers for the load were previously used in an operation involving stack 200.

As shown in FIG. 3, in some embodiments, prediction mechanism 312 receives register information 338 from register file 314. Register file 314 is a functional block that includes a number of register circuits that are configured to store data for use by core 102. Generally, core 102 uses register file 314 as a fast-access memory that holds data to be used (as inputs) for instructions to be executed by execution unit 306 and produced (as outputs) by execution unit 306. Issue unit 304 reads register file 314 to acquire inputs for instructions to be issued to execution unit 306 and execution unit 306 writes back WB data 320 to register file 314 after instructions have completed execution.

Figure 6:
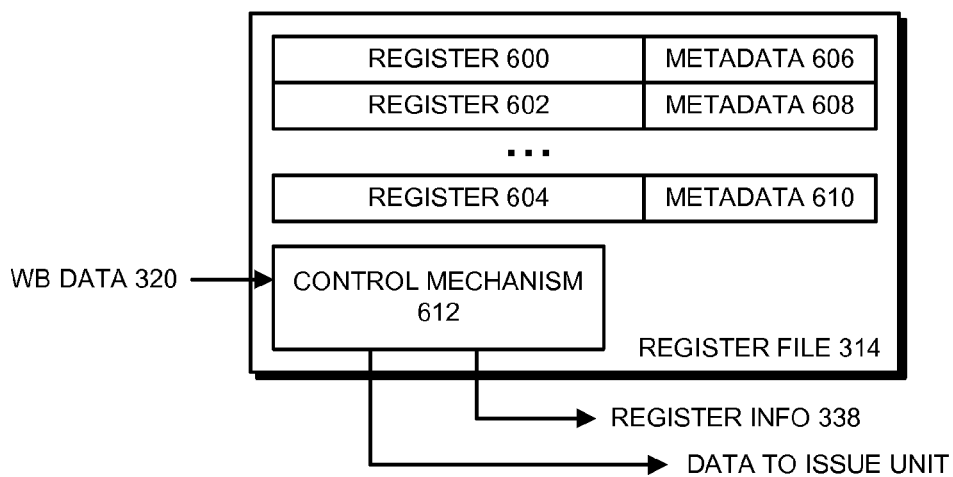
FIG. 6 presents a block diagram illustrating a register file in accordance with some embodiments.

FIG. 6 presents a block diagram illustrating register file 314 in accordance with some embodiments. As can be seen in FIG. 3, register file 314 includes registers 600-604 and associated metadata 606-610, and control mechanism 612. The data that may be stored in each of register 600-604 generally includes any type of data that can be used in execution unit 306 (e.g., in some or all of an integer execution unit, a branch execution unit, etc.). For example, in some embodiments, each register is a 32-bit or 64-bit register that holds data for use in execution unit 306. The metadata (i.e., metadata 606-610) for each register generally includes any type of metadata useful for handling or identifying the data in the corresponding register. For example, the metadata may include information for identifying a source of the data in the corresponding register, information indicating whether the register was previously used in an operation involving stack 200, etc.

Although core 102 is shown in FIG. 3 with various functional blocks, in some embodiments, core 102 includes different types and/or arrangements of functional blocks. In these embodiments, some or all of the operations described as being performed by a given functional block in FIG. 3 may be performed by a different functional block. For example, in some embodiments, some or all of prediction mechanism 312 is included in a different functional block or functional blocks in core 102, such as issue unit 304 and/or load-store unit 308, where the above-described operations are performed. As another example, register file 314 may be read by decode unit 302 instead of issue unit 304. Generally, core 102 includes sufficient functional blocks to perform the operations herein described.

In addition, although an embodiment is presented where prediction mechanism 312 takes load information 336 and register information 338 as inputs, in some embodiments different types and/or arrangements of information may be used for generating prediction 326. For example, although both load information 336 and register information 338 are shown as inputs to prediction mechanism 312 in FIG. 3, in some embodiments only one of load information 336 and register information 338 is taken as an input to prediction mechanism 312 (and are used in generating prediction 326 as described above). As another example, in some embodiments, information about the load instruction (e.g., a program counter, information about one or more instructions before and/or after the load instruction, etc.) or core 102 (e.g., an operating state of core 102, etc.) may be used alone or in combination with other information about the load instruction to generate prediction 326. In embodiments where a program counter is used, a look-up table may be maintained by prediction mechanism 312 that correlates previous program counters with actual resolutions for requests 328 and 332 that is used when generating prediction 326. As yet another example, register information 338 (e.g., identification of registers used in operations involving the stack pointer) may be received from a different source in core 102, such as a renaming unit (which controls assignment of registers in core 102), etc.

Also, although various functional blocks (e.g., register file 314 and store buffer 310) are shown with particular numbers of entries, registers, etc., in some embodiments, these functional blocks include a different number of entries, registers, etc., as is shown by the ellipses in the corresponding figures.

Processes for Handling Loads

Figure 7:
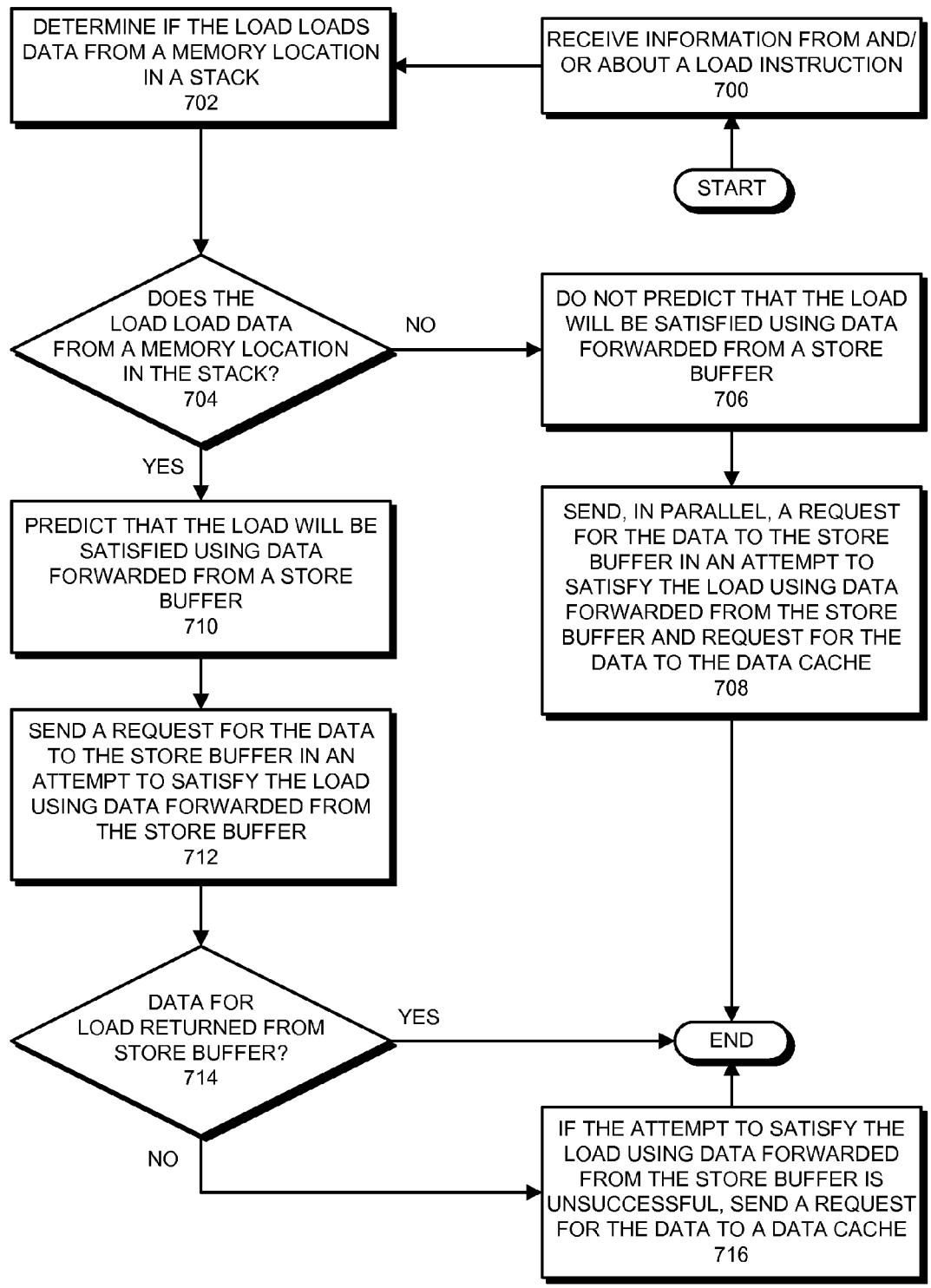
FIG. 7 presents a flowchart illustrating a process for handling loads in accordance with some embodiments.

FIG. 7 presents a flowchart illustrating a process for handling loads in accordance with some embodiments. Note that the operations shown in FIG. 7 are presented as a general example of functions performed by some embodiments. The operations performed by other embodiments include different operations and/or operations that are performed in a different order. Additionally, although certain functional blocks are used in describing the process, in some embodiments, other functional blocks perform at least some of the operations.

In the following example, operations are described using a generic "load instruction," which serves as an example of an instruction that causes load-store unit 308 to load data to core 102. However, some embodiments perform similar operations for other instructions that cause load-store unit 308 to load data from the memory hierarchy into core 102. For example, some embodiments include two or more variants of load instructions, which may be handled as described below.

The operation shown in FIG. 7 starts when prediction mechanism 312 receives information from and/or about a load instruction that is to be executed in load-store unit 308

(step 700). In some embodiments, this operation includes receiving load information 336 for the load from decode unit 302, register information 338 for the load from register file 314, and/or other information from and/or about the load. For example, upon decoding a load instruction, decode unit 302 can send information about the load instruction (e.g., a type of the load instruction, a program counter for the load instruction, address information or register information from the load instruction, information about instructions before and/or after the load instruction, etc.) as load information 336 to prediction mechanism 312. As another example, upon receiving an indication that a load is to be executed from decode unit 302 and/or from another functional block, prediction mechanism 312 can request register information from register file 314 (or, as described above, from another functional block in core 102 such as a rename unit) and can receive a response from register file 314 with register information 338. Generally, prediction mechanism 312 receives one or more pieces of information that may be used to determine if the load loads data from a memory location in stack 200.

Prediction mechanism 312 then determines if the load loads data from a memory location in stack 200 (step 702). This operation generally includes using the information from and/or about the load to determine if a memory location from which the load loads data is a memory location in stack 200 and/or if a register used by the load (e.g., as an input to the load) is a register that was used in an operation involving the stack.

For example, reconciler 500 may compute or determine some or all of virtual or physical address for the load and predictor 502 can compare the computed virtual or physical address with addresses of memory locations known to be in stack 200 to make the determination. To enable the comparison, predictor 502 may maintain a record of memory locations in stack 200 and/or retrieve information about memory locations in stack 200 from other functional blocks in core 102. For example, predictor 502 and/or another functional block in core 102 may keep a record of a base pointer for stack 200 and a current size of stack 200 and/or a top pointer for stack 200 or retrieve some or all of these from another functional block. In some embodiments, reconciler 500 passes a base pointer for the load to predictor 502 and predictor 502 determines that the load loads data from the stack when the base pointer is within a threshold number of memory locations/addresses from a base of the stack (e.g., within eight, sixteen, or another number of memory locations/addresses from base pointer for the stack).

As another example, reconciler 500 may acquire information from metadata (e.g., metadata 606-610) for one or more source registers for the load instruction to determine if the one or more registers were used in an operation that involved a pointer to stack 200. For example, if one or more source registers for the load were destination registers during a prior operation for which a register that contained a pointer to the stack (base pointer, top pointer, etc.) was an input, were set equal to a pointer to the stack, had the pointer to the stack copied into them, etc. In some embodiments, the metadata for the register includes a flag (e.g., a bit) that is set to indicate that the register was used as a destination for an operation involving the stack. In these embodiments, reconciler 500 can simply read the flag to determine if one or more registers were used in an operation that involved a pointer to stack 200. If so, reconciler 500 can signal predictor 502 that at least one of the source registers for the load instruction one or more source registers for the load instruction were used in an operation involving the stack. From this signal, predictor 502 can determine that the load loads data from a memory location in stack 200.

If the load does not load data from a memory location in stack 200 (step 704), prediction mechanism 312 does not predict that the load will be satisfied using data forwarded from store buffer 310 (step 706). For example, prediction mechanism 312 may send a prediction 326 for the load with a predetermined value indicating that no prediction is being made (e.g., 0, 999, NP, etc.) or may not send prediction 326 for the load. When no prediction is received, load-store unit 308, upon executing the load instruction, sends, in parallel: (1) a request for the data to the store buffer 310 in an attempt to satisfy the load using forwarded data 330 from store buffer 310 and (2) a request for the data 334 to satisfy the load to a cache 108 (step 708). Note that, in this case, both requests are sent at the same time. However, if forwarded data 330 is received from store buffer 310, forwarded data 330 is preferentially used (i.e., instead of data 334 from cache 108). In this way, the most recent copy of the data for the load is used for operations in core 102.

Otherwise, if the load loads data from a memory location in stack 200 (step 704), prediction mechanism 312 predicts that the load will be satisfied using data forwarded from store buffer 310 (step 710). More specifically, prediction mechanism 312 generates and sends prediction 326 to load-store unit 308, prediction 326 including an indication that the load is predicted to be satisfied using forwarded data 330 from store buffer 310. For example, in some embodiments, prediction 326 is sent using a single signal line between prediction mechanism 312 and load-store unit 308 that is asserted (e.g., set to a logical 1) when the load is predicted to be satisfied using forwarded data 330 and deasserted (e.g., set to a logical 0) otherwise. In some embodiments, the single signal line is configured to be asserted when (i.e., at the same time that) the corresponding load instruction is executed in load-store unit 308. As another example, in some embodiments, prediction 326 is a packet or a data unit that is sent from prediction mechanism 312 to load-store unit 308 on one or more signal buses between prediction mechanism 312 and load-store unit 308 which includes the prediction and zero or more additional pieces of information for load-store unit 308 (e.g., an identifier for the load instruction that is being predicted, etc.). Generally, prediction 326 includes sufficient information to enable load-store unit 308 to determine that it has been predicted that a given load instruction will be satisfied using data forwarded from store buffer 310.

As described below, in some embodiments, prediction mechanism 312 may use one or more other factors to control and/or adjust the generation of prediction 326 for a load instruction. For example, in some embodiments, an operating state of core 102, a flag (e.g., a bit) set by an operating system on core 102, a number of stores in store buffer 310 to memory locations in stack 200, etc. can be used when generating the prediction whether or not the load will be satisfied using data forwarded from store buffer 310. In these embodiments, the other factors may be used to override a prediction that might have been made based on information from the load instruction and/or register information. For example, information from the load instruction and/or register information may indicate that the load should not be predicted to be satisfied using data forwarded from store buffer 310, but, based on the one or more other factors, core 102 may automatically predict that the load will be satisfied using data forwarded from store buffer 310. In other words, in these embodiments, prediction 326 may be used to cause core 102 to use the serial approach (in contrast to the parallel approach) when sending requests to store buffer 310 and/or cache 108 for a variety of reasons (e.g., power savings, communication bandwidth conservation, etc.).

In some embodiments, the above-described factors include a threshold number of stores to stack 200 being held in store buffer 310. In these embodiments, prediction mechanism 312 and/or store buffer 310 maintains a count of stores to memory locations in the stack (which may be identified using flags in store buffer 310, address information, etc.). In these embodiments, when store buffer 310 holds more than the threshold number of stores to memory locations in stack 200, it is more likely that data for satisfying a load is present in store buffer 310—and prediction mechanism 312 may therefore permit predictions that loads will be satisfied using data from store buffer 310. Otherwise, if less than a threshold number of stores to memory locations in stack 200 are held in store buffer 310, prediction mechanism 312 may prevent such predictions from being made.

Although embodiments are described where the prediction is made based on whether or not the load loads data from a memory location in the stack, in some embodiments, different information is used to make the prediction. For example, in some embodiments, reconciler 500 acquires, generates, or extracts information identifying the load from one or more sources in core 102 and sends the information identifying the load to predictor 502. For example, in some embodiments, reconciler 500 acquires some or all of a program counter for the load instruction and sends the program counter to predictor 502. In some embodiments, upon receiving the information identifying the load, predictor 502 performs a look-up in a table or record to determine if the load was previously satisfied using data forwarded from store buffer 310. (In these embodiments, predictor 502 maintains a table or record identifying load instructions that were previously satisfied using data forwarded from store buffer 310 that is used to perform the look-up.) If the load was previously satisfied using data forwarded from store buffer 310, predictor 502 can generate prediction 326 with information that enables load-store unit 308 to determine that it has been predicted that the corresponding load instruction will be satisfied using data forwarded from store buffer 310.

Returning to FIG. 7, after receiving prediction 326 from prediction mechanism 312 that predicts that the load instruction will be satisfied using data forwarded from a store buffer (step 710), load-store unit 308 first sends a request for the data to the store buffer 310 in an attempt to satisfy the load using forwarded data 330 from the store buffer 310 (step 712). If forwarded data 330 is returned from store buffer 310 (step 714), the process ends. More specifically, the load has been satisfied and forwarded data 330 may be made available for subsequent operations (e.g., stored in a register in core 102, etc.)—and so a request is not also sent to cache 108 for data 334 to satisfy the load. Otherwise, if forwarded data 330 is not returned from store buffer 310 (step 714) and thus the attempt to satisfy the load using forwarded data 330 from store buffer 310 is unsuccessful, load-store unit 308 sends a request for the data to satisfy the load to cache 108 (step 716). In this case, data 334 should eventually be returned from cache 108 (or from a lower level in the hierarchy, if necessary) to satisfy the load and may be made available for subsequent operations (e.g., stored in a register in core 102, etc.).

Retaining Stores in a Post-Commit Store Buffer

Some embodiments include a post-commit store buffer that is located between store buffer 310 and L1 cache 108 (and/or one or more other levels of the memory hierarchy). In these embodiments, as a store is committed, the store data is written from store buffer 310 the post-commit store buffer, where the store data is held until L1 cache 108 is available to have the data stored therein. In these embodiments, the post-commit store buffer can be configured to be searched for data to be forwarded when processing loads, and can be searched during snoops of L1 cache 108 (thereby ensuring that the post-commitment store data is accessible in the post-commit store buffer).

In some embodiments, the post-commit store buffer can be used to retain some types of stores after the store has been written back to L1 cache 108 and/or lower levels of the memory hierarchy (thereby committing the stores) to enable core 102 to more efficiently provide forwarded data 330 to load-store unit 308. For example, in some embodiments, stores to memory locations in stack 200 are retained in the post-commit store buffer to enable forwarding data to load-store unit 308. In these embodiments, stores to non-stack region 202 can be replaced by new stores to stack 200 in post-commit store buffer before (or instead of) stores to stack 200 are replaced. For example, assuming store A to stack 200 and store B to non-stack region 202 are both in post-commit store buffer and store C to stack 200 is to replace one of stores A and B (after the data for stores A and B are written to lower levels of the memory hierarchy in program order). In these embodiments, store B is preferentially replaced by store C. In some embodiments, stores to stack 200 are held in post-commit store buffer until a given amount of time has passed, until more threshold number of retained stores to stack 200 is held in post-commit store buffer, etc. and then are overwritten by newer stores (to stack 200 or non-stack region 202).

In some embodiments, the post-commit store buffer includes one or more mechanisms to enable the retention of the post-commit store data described above. For example, in some embodiments, the post-commit store buffer holds both virtual addresses and physical addresses for the data held in the post-commit store buffer to enable searches of the post-commit store buffer using either type of address. In addition, the post-commit store buffer (or, more generally, core 102) includes processing circuits for monitoring retained stores, determining which stores are directed to stack 200 and non-stack region 202, replacing store data in the post-commit store buffer, etc.

Variants of Load Instructions

In some embodiments, the load instructions supported by core 102 include one or more load instruction variants that include information indicating that a prediction should be made by prediction mechanism 312 that the load will be satisfied using data forwarded from a store buffer because the load loads data from a memory location in a stack. For example, the load instruction variants may include a load-after-stack-store variant that indicates that the load is likely to load data that is still held in stack 200. In some embodiments, the information indicating that the prediction should be made includes an opcode for the load instruction, one or more flags in the instruction, one or more flags associated with the load instruction in core 102, etc. In these embodiments, the information from the load instruction may be passed to prediction mechanism 312 as load information 336.

In some embodiments, core 102 (e.g., via a just-in-time compiler, program code analyzer, etc.) is configured to recognize when a load instruction that loads particular data closely follows a store of the particular data to stack 200. Core 102 then dynamically changes the load instruction (e.g., changes the opcode for the instruction, changes metadata for the instruction, etc.) include the information indicating that a prediction should be made by prediction mechanism 312 that the load will be satisfied using data forwarded from a store buffer because the load loads data from a memory location in a stack.

In some embodiments, other types of loads could be handled in a similar way. For example, non-stack loads that closely follow stores to matching addresses could be replaced as described above (i.e., with a load-after-stack-store variant) that is processed accordingly.

Handling Loads

In some embodiments, load requests for loads that load data from stack 200 and/or non-stack region 202 may be sent to the memory hierarchy without a request for the data being sent to store buffer 310 based on one or more counters that keep a record of the number of buffered stores to stack 200 and/or non-stack region 202 that are held in the store buffer. More specifically, in some embodiments, as stores are buffered in store buffer 310, a counter is incremented based on where the data is destined. For example, a stack counter may be updated for each buffered store that is destined for stack 200 and a non-stack counter may be adjusted for each buffered store that is destined for non-stack region 202. These counters are then decremented as each store is sent to the memory hierarchy and removed from store buffer 310. In these embodiments, upon receiving a load that loads data from stack 200 or non-stack region 202, load-store unit 308 checks the appropriate counter to determine if there are any stores to the corresponding region in store buffer 310. If not, the load may be sent to the memory hierarchy without a request being sent to store buffer 310. For example, if a load loads data from non-stack region 202 and the non-stack region counter is 0, which shows that store buffer 310 holds no buffered stores to non-stack region 202, a request for the data for the load is not to store buffer 310.

In some embodiments, a computing device (e.g., computing device 100) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium may include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/processor cores/central processing units (CPUs), application-specific integrated circuit (ASIC) chips, field-programmable gate arrays (FPGAs), caches/cache controllers, embedded processors, microcontrollers, graphics processors (GPUs)/graphics processor cores, Accelerated processing units (APUs), pipelines, and/or other programmable-logic devices. When such hardware modules are activated, the hardware modules perform some or all of the operations. In some embodiments, the hardware modules include one or more general-purpose circuits that are configured by executing instructions (program code, microcode/firmware, etc.) to perform the operations.

In some embodiments, a data structure representative of some or all of the structures and mechanisms described herein (e.g., computing device 100 and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits (e.g., processing circuits, logic circuits, control circuits, etc.) that perform the described operations. In some embodiments, functional blocks include general-purpose circuits (e.g., pipelines, compute units, etc.) that execute program code (e.g., microcode, firmware, applications, etc.) and/or may be configured to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for handling loads in a core, comprising:
    in the core, performing operations for:
        predicting that a load will be satisfied using data forwarded from a store buffer if the load loads data from a memory location in a stack; and
        based on the prediction,
            sending a request for the data to the store buffer in an attempt to satisfy the load using data forwarded from the store buffer; and
            if the attempt to satisfy the load using data forwarded from the store buffer is unsuccessful, sending a request for the data to satisfy the load to a cache.

2. The method of claim 1, further comprising:
    when the load loads data from a memory location in a non-stack region, in parallel:
        sending a request for the data to the store buffer in an attempt to satisfy the load using data forwarded from the store buffer; and
        sending a request for the data to satisfy the load to the cache.

3. The method of claim 1, further comprising:
    when the load loads data from a memory location in a non-stack region, in overlapping timeframes:

sending a request for the data to the store buffer in an attempt to satisfy the load using data forwarded from the store buffer; and sending a request for the data to satisfy the load to the cache.

4. The method of claim 1, wherein predicting that the load will be satisfied using data forwarded from the store buffer if the load loads data from a memory location in the stack comprises:

acquiring an address for the load; and when the address for the load is within a predetermined threshold of a address associated with the stack, predicting that the load will be satisfied using data forwarded from the store buffer because the load loads data from a memory location in the stack.

5. The method of claim 4, wherein acquiring the address for the load comprises, when the load uses a base address and an offset for computing the address for the load, acquiring the base address for the load.

6. The method of claim 1, wherein predicting that the load will be satisfied using data forwarded from the store buffer if the load loads data from a memory location in the stack comprises:

identifying at least one source register for the load; and when metadata for the at least one source register indicates that the at least one source register is associated with the stack, predicting that the load will be satisfied using data forwarded from the store buffer because the load loads data from a memory location in the stack.

7. The method of claim 1, wherein predicting that the load will be satisfied using data forwarded from the store buffer if the load loads data from a memory location in the stack comprises:

maintaining a record that identifies loads that have been satisfied using data forwarded from the store buffer; and when the load is present in the record, predicting that the load will be satisfied using data forwarded from the store buffer.

8. The method of claim 1, further comprising:

predicting that a load will be satisfied using data forwarded from the store buffer when a corresponding load instruction comprises one or more indications that the load loads data from a memory location in the stack.

9. The method of claim 1, further comprising:

maintaining a count of stores to a memory location in the stack that are presently held in the store buffer; and not predicting that the load will be satisfied using data forwarded from the store buffer when the count is less than a threshold value.

10. The method of claim 1, further comprising:

retaining stores that are identified as stores to memory locations in the stack in the store buffer, wherein retaining the stores comprises keeping the stores in the store buffer, despite the stores having been committed to a lower level cache or memory.

11. The method of claim 1, further comprising:

when some or all of the core is in a lower-power mode, automatically predicting that the load will be satisfied using data forwarded from the store buffer.

12. An apparatus for handling loads, comprising:

a core;

a store buffer coupled to the core; and a cache coupled to the core;

wherein the core is configured to:

predict that a load will be satisfied using data forwarded from the store buffer if the load loads data from a memory location in a stack; and based on the prediction, send a request for the data to the store buffer in an attempt to satisfy the load using data forwarded from the store buffer; and if the attempt to satisfy the load using data forwarded from the store buffer is unsuccessful, send a request for the data to satisfy the load to the cache.

13. The apparatus of claim 12, wherein the core is further configured to, when the load loads data from a memory location in a non-stack region, in parallel:

send a request for the data to the store buffer in an attempt to satisfy the load using data forwarded from the store buffer; and send a request for the data to satisfy the load to the cache.

14. The apparatus of claim 12, wherein the core is further configured to, when the load loads data from a memory location in a non-stack region, with overlapping timeframes:

send a request for the data to the store buffer in an attempt to satisfy the load using data forwarded from the store buffer; and send a request for the data to satisfy the load to the cache.

15. The apparatus of claim 12, wherein, when predicting that the load will be satisfied using data forwarded from the store buffer if the load loads data from a memory location in the stack, the core is configured to:

acquire an address for the load; and when the address for the load is within a predetermined threshold of a address associated with the stack, predict that the load will be satisfied using data forwarded from the store buffer because the load loads data from a memory location in the stack.

16. The apparatus of claim 12, wherein, when predicting that the load will be satisfied using data forwarded from the store buffer because the load loads data from a memory location in the stack, the core is configured to:

identify at least one source register for the load; and when metadata for the at least one source register indicates that the at least one source register is associated with the stack, predict that the load will be satisfied using data forwarded from the store buffer because the load loads data from a memory location in the stack.

17. The apparatus of claim 12, wherein, when predicting that the load will be satisfied using data forwarded from the store buffer because the load loads data from a memory location in the stack, the core is configured to:

maintain a record that identifies loads that have been satisfied using data forwarded from the store buffer; and when the load is present in the record, predict that the load will be satisfied using data forwarded from the store buffer.

18. The apparatus of claim 12, wherein the core is configured to:

maintain a count of stores to a memory location in the stack that are presently held in the store buffer; and not predict that the load will be satisfied using data forwarded from the store buffer when the count is less than a threshold value.

19. A non-transitory computer-readable storage medium containing instructions that, when executed by a core, cause the core to perform a method for handling loads in the core, the method comprising:

predicting that a load will be satisfied using data forwarded from a store buffer if the load loads data from a memory location in a stack; and based on the prediction, sending a request for the data to the store buffer in an attempt to satisfy the load using data forwarded from the store buffer; and if the attempt to satisfy the load using data forwarded from the store buffer is unsuccessful, sending a request for the data to satisfy the load to a cache.

20. The computer-readable storage medium of claim 19, wherein the method further comprises:

when the load loads data from a memory location in a non-stack region, in parallel:

sending a request for the data to the store buffer in an attempt to satisfy the load using data forwarded from the store buffer; and sending a request for the data to satisfy the load to the cache.

21. The computer-readable storage medium of claim 19, wherein the method further comprises:

when the load loads data from a memory location in a non-stack region, in overlapping timeframes:

sending a request for the data to the store buffer in an attempt to satisfy the load using data forwarded from the store buffer; and sending a request for the data to satisfy the load to the cache.

22. The computer-readable storage medium of claim 19, wherein predicting that the load will be satisfied using data forwarded from the store buffer if the load loads data from a memory location in the stack comprises:

acquiring an address for the load; and when the address for the load is within a predetermined threshold of a address associated with the stack, predicting that the load will be satisfied using data forwarded from the store buffer because the load loads data from a memory location in the stack.

23. The computer-readable storage medium of claim 19, wherein predicting that the load will be satisfied using data forwarded from the store buffer if the load loads data from a memory location in the stack comprises:

identifying at least one source register for the load; and when metadata for the at least one source register indicates that the at least one source register is associated with the stack, predicting that the load will be satisfied using data forwarded from the store buffer because the load loads data from a memory location in the stack.

24. The computer-readable storage medium of claim 19, wherein predicting that the load will be satisfied using data forwarded from the store buffer if the load loads data from a memory location in the stack comprises:

maintaining a record that identifies loads that have been satisfied using data forwarded from the store buffer; and when the load is present in the record, predicting that the load will be satisfied using data forwarded from the store buffer.

25. The computer-readable storage medium of claim 19, wherein the method further comprises:

maintaining a count of stores to a memory location in the stack that are presently held in the store buffer; and not predicting that the load will be satisfied using data forwarded from the store buffer when the count is less than a threshold value.

26. A method for handling loads in a core, comprising:

in the core, performing operations for:

predicting that a load will be satisfied using data forwarded from a store buffer if the load loads data from a memory location in a stack; and based on the prediction, sending a request for the data to the store buffer in an attempt to satisfy the load using data forwarded from the store buffer, wherein a request for the data is not sent to a cache when the request for the data is sent to the store buffer.

* * * * *